Patented May 20, 1930

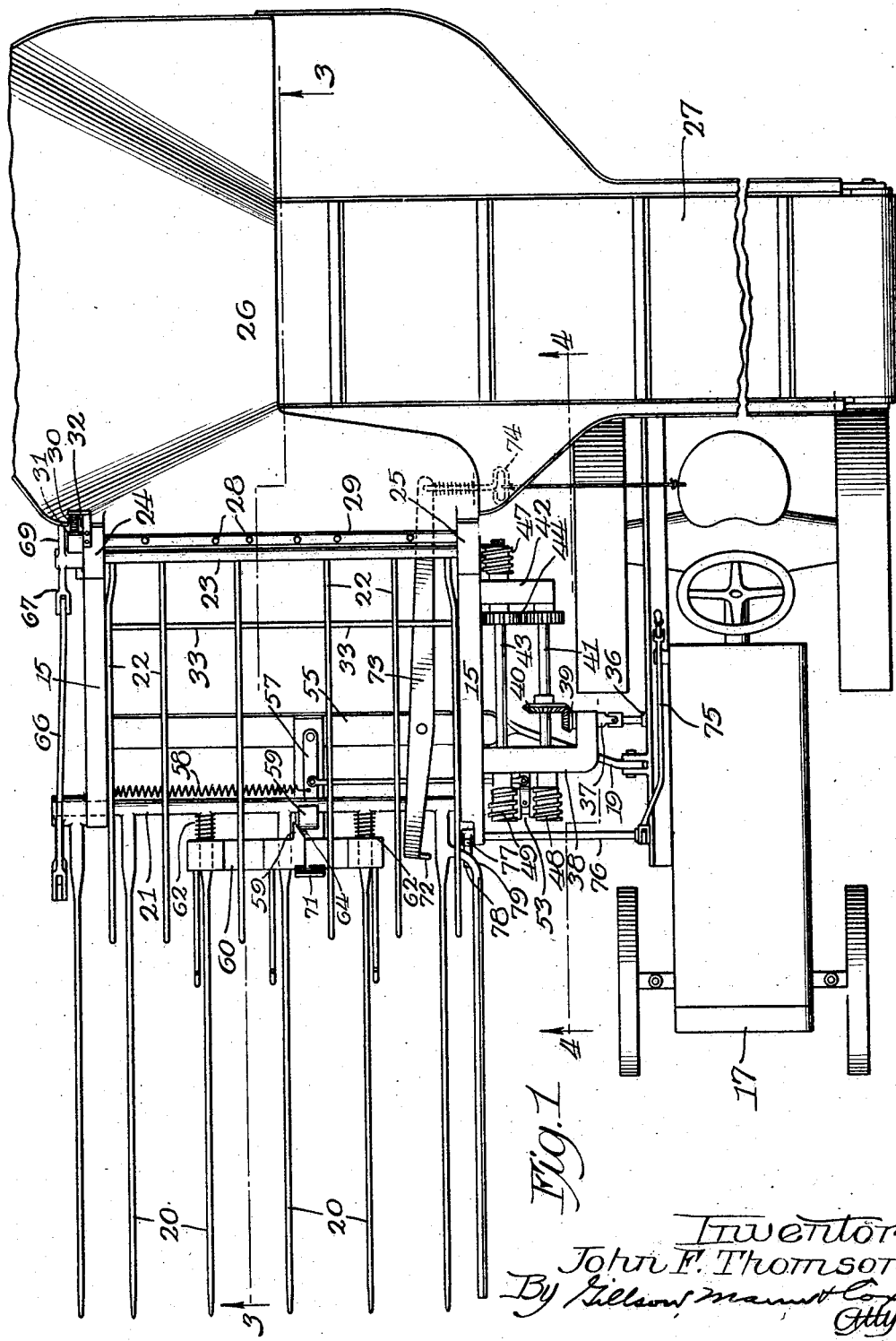

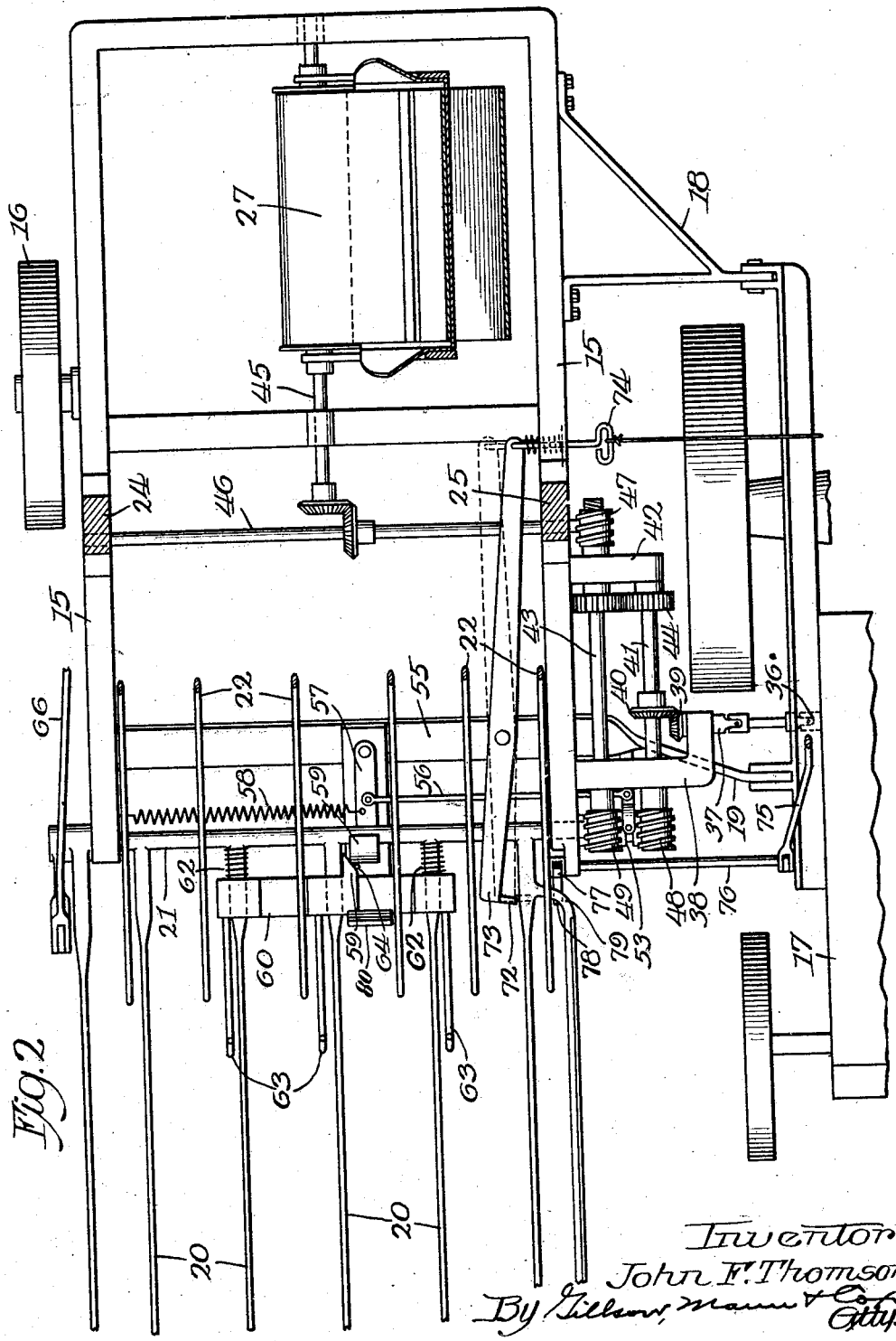

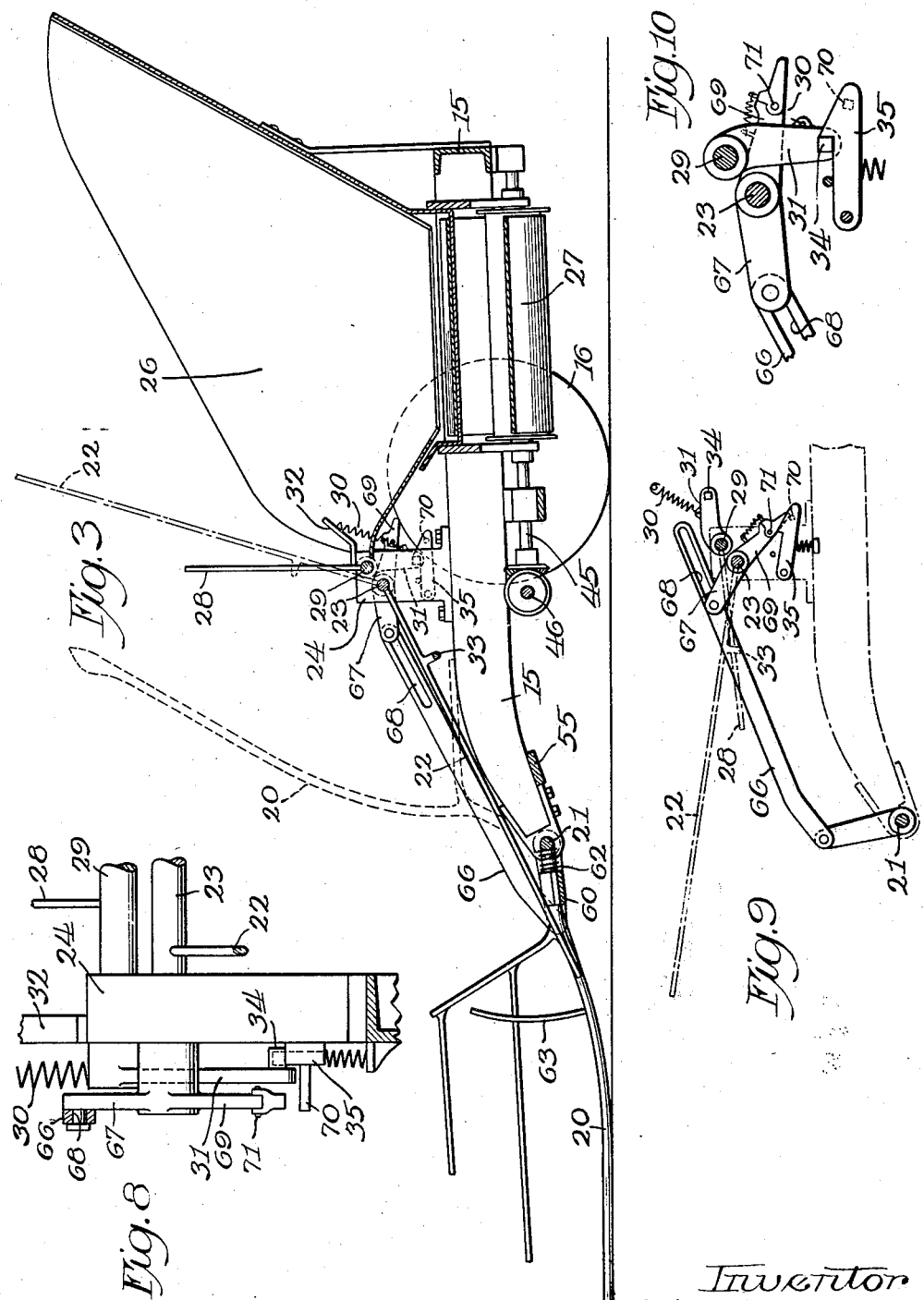

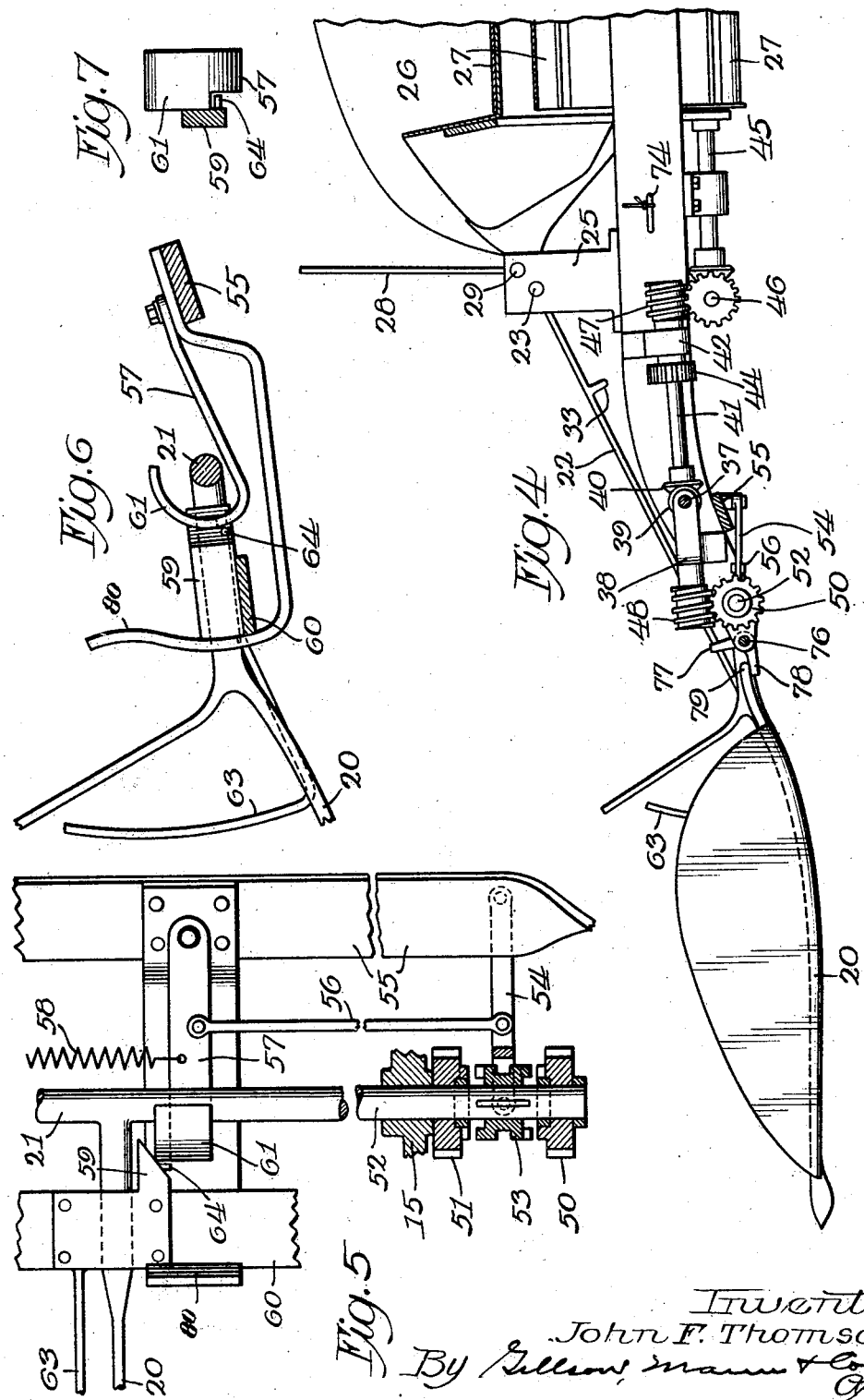

1,759,073

UNITED STATES PATENT OFFICE

JOHN F. THOMSON, OF CHICAGO, ILLINOIS

SHOCK LOADER

Application filed September 20, 1928. Serial No. 307,092.

This invention relates to that type of shock loader in which there is employed an oscillating lifting fork delivering to an oscillating transfer element which in turn delivers to a suitable receptacle such as the hopper of an elevator carried by the machine.

The objects of the invention are to improve the mechanism for controlling and actuating the lifting and transferring elements and to provide a movable wall for the receiving hopper for the purpose of retaining the delivered shocks until they can be carried away by the elevator.

An operative embodiment of the invention is hereinafter described and is illustrated in the accompanying drawings, in which Fig. 1 is a plan view of the machine, the parts being shown in receiving position;

Fig. 2 is a detail plan section of the device showing the movable parts in the same position as in Fig. 1;

Fig. 3 is a longitudinal, vertical section on the line 3—3 of Fig. 1;

Fig. 4 is a detail section on the line 4—4 of Fig. 1; and

Figs. 5, 6, 7, 8, 9 and 10 are details of various operating and controlling mechanisms of the device.

The machine as shown comprises a frame element 15 of suitable form, one side supported by the wheel 16 and the other, by the tractor 17 to which it is attached by means of brackets 18, 19. An elevating fork 20 projects forwardly from the frame of the machine, its head 21 being journalled in suitable boxes carried by the side members thereof. A transfer fork 22 is located back of the elevating fork, its head 23 being journalled in standards 24, 25 mounted on the side members of the frame 15 and delivers to a receptacle 26 carried at the rear end of the frame and forming a hopper from which leads laterally an elevator 27 which may deliver into a wagon (not shown) driven alongside of the machine.

The side of the receptacle toward the mechanism for delivering material thereto is necessarily low to provide a delivery passage. As the action of the elevator is necessarily somewhat slow, the material has a tendency to fall back into the delivery passage and out of the zone of action of the elevator.

One of the features of the invention is the provision of a removable wall for the receiving side of the receptacle, which is erected after each charge is delivered, and is removed in advance of the delivery of the next charge. This wall preferably takes the form of an oscillating fork 28, the head 29 of which is journalled in suitable boxes mounted on the standards 24, 25 slightly above and to the rear of the head 23 of the transfer element 22.

The wall 28 is normally swung forwardly to rest upon the transfer element 22, when the latter is in its lowered position, by a tension spring 30 attached to a crank arm 31 projecting backwardly from the head 29, and a bracket arm 32 carried by one of the standards as 24. The wall 28 is raised by the transfer element 22 to its upright position as shown in dotted lines in Fig. 3, and when this wall takes the form of a fork as shown, the tines of the element 22 carry a cross member 33 upon which the tines of the wall rest. The wall 28 is locked in its upright position by the engagement of a stud 34 carried by the crank arm 31 with a spring detent 35, and prevents the load delivered to the receptacle 26 from falling backwardly as the transfer element 22 makes its return stroke, holding it within the receptacle a sufficient length of time to insure its conveyance away by the elevator 27.

The various movable elements of the device are actuated by the tractor 17, a jack shaft 36 thereof being coupled to a shaft 37 journalled in a bracket 38 carried by the frame 15 and driving by means of a pair of bevelled gears 39, 40 a shaft 41, journalled longitudinally of the frame of the machine in the bracket 38 and the bracket 42.

A shaft 43 is journalled in the brackets 38, 42 parallel with the shaft 41 and is geared thereto as shown at 44. The elevator 27 is driven by a shaft 45 in bevel gear connection with a worm shaft 46 journalled in the side members of the frame 15 and driven by means of a worm 47 carried by one of the parallel shafts, as 43.

The shafts 41, 43 carry at their forward ends worms 48, 49 which mesh respectively with worm gears 50, 51 mounted loosely upon a shaft extension 52 of the head 21 of the elevating fork 20. A clutch element 53 splined upon the shaft extension 52 between the gears 50, 51 cooperates with both to lock them alternatively to the shaft 52, and may occupy an intermediate position, when it is disengaged from both gears.

The clutch element 53 is controlled by a shipper lever 54 pivoted on a cross bar 55 carried by the side members of the frame 15 and actuated by means of a link 56 attached to a forwardly projecting lever 57 also pivoted on the bar 55, a retractile spring 58 reacting between the lever 57 and the side member of the frame normally urging the clutch element into engagement with the gear 51. The forward end of the lever 57 projects under the head 21 and is curved upwardly and backwardly thereover, the upturned portion being widened. A cam element 59 carried by a bar 60 slidingly mounted upon tines of the elevator element 20 is engageable with the upturned end 61 of the lever 57 and, when the bar 60 is moved backwardly against the resistance of springs as 62, mounted on elevator tines and reacting against its head 21, swings the lever 57 against the resistance of the spring 58 to engage the clutch element 53 with the gear 50.

Upstanding prongs 63 carried by the bar 60 constitute an abutment for engagement by the load picked up by the elevator element as its tines are thrust under a shock, the bar and its cam 59 being thus urged backwardly to lock the gear 50 to the shaft 52 and cause the upward swing of the elevator.

As the fork 20 moves upwardly, the weight of its load bearing upon the prongs 63 holds the cam 59 in its advanced position. As an additional precaution against accidental withdrawal of the cam before the fork shall have completed its upward stroke, a stud 64 is carried by the cam 59 and when the latter is initially advanced, is moved under the widened portion of the upturned end 61 of the lever 57 and during the upward stroke the retraction of the cam is prevented by the engagement of this stud on the inner face of this portion of the lever. At the completion of the upward stroke, the stud will have passed beyond the overturned portion 61 of the lever and the cam will be immediately retracted by the action of expansion springs 62 interposed between the bar 60 and the fork head 21, whereupon the spring 58 will cause the shifting of the clutch element 53 into engagement with the gear 51 and the elevating fork will be lowered.

The transferring fork 22 is swung upwardly by means of a link 66 connecting the elevating fork with a crank arm 67 projecting from the end of the head 23. Sufficient lost motion in this connection is provided to delay upward movement of the transferring fork until the load shall have been carried above it. For this purpose, the crank pin on the arm 67 engages in an elongated slot 68 in the bar 66.

During the latter portion of the up-stroke of the elevating fork, its load is shifted to the transferring fork which carries it over and deposits it into the receptacle 26. As the elevating fork makes its downward stroke, the transferring fork is carried backwardly by the link bar 66, until it passes the vertical, whereupon it is free to fall by gravity. As the transferring fork is raised, it carries with it the wall 28, which is of course below or back of the charge and which at the end of its upward movement is locked by the engagement of its crank arm 31 with the detent 35 and consequently does not descend with the fork 22, but remains in its upright position a sufficient length of time to enable the elevator 27 to carry away the material which has been last deposited in the receptacle 26. To insure the dropping of the wall 28 under the influence of its controlling spring 30 before the next load shall have been deposited on the fork 22, the head 23 is provided with a crank arm 69 and so positioned that it will disengage the detent 35 from the crank arm 31 early in the upstroke of the fork 22 and before it has received its load. The arm 69 acts upon the detent 35 by engaging a lateral stud 70 projecting therefrom, and which it passes as its movement progresses. In order that the crank arm may freely pass the stud 70 on its return movement, it is jointed as indicated at 71 to permit its flexure on its up-stroke.

The clutch 53 remains in engagement with the gear 51 until the fork 20 has nearly completed its downward stroke when the bar 60 comes into engagement with a fixed upwardly projecting cam arm 80 so shaped as to urge the bar backwardly a sufficient distance to cause the cam 59 to shift the clutch element 53 to neutral position as shown in Fig. 5.

After this release has taken place, the fork 20 is arrested in its downward movement by the engagement of one of its tines with a stop lug 72 formed upon a spring controlled lever 73 pivoted upon the cross bar 55. The fork 20 is thus held out of contact with the ground, while the machine is being moved to the next shock.

The lever 73 is controlled by the operator through the medium of a pull handle 74 by means of which he permits the fork 20 to drop to the ground as the next shock is approached.

The fork 20 may be manually controlled against any tendency to be deflected upwardly, or to free it from engagement with the soil, by means of a hand crank 75 fixed upon a rock shaft 76 carrying crank fingers 77, 78 which may be engaged over or under a lateral shank 79 of the outer tine of the fork.

Various changes in the details of the machine may be made within the scope of the invention.

I claim as my invention:

1. In a machine of the class described, in combination, a lifting element, a transferring element receiving from the lifting element, a receptacle to which the transferring element delivers, a movable wall for the receiving side of the receptacle, means for erecting the wall after the delivery of the material to the receptacle, and means for displacing the wall in advance of each delivery.

2. In a machine of the class described, in combination, a lifting element, a receptacle, an elevator leading from the receptacle, means for intermittently transferring material from the lifting element to the receptacle, and removable means for closing the delivery passage to the receptacle after each delivery.

3. In a machine of the class described, in combination, a lifting element, a receptacle, an elevator leading therefrom, an oscillating element for transferring material to the receptacle, an oscillating wall pivotally mounted between the transferring element and the receptacle, means for swinging the wall upwardly as the named element makes its advance stroke, means for locking the wall in its upright position, and means for withdrawing the wall before the next succeeding advance stroke of the element.

4. In a machine of the class described, in combination, an oscillating elevating element, an oscillating delivery element receiving from the elevating element, a receptacle receiving from the delivery element, an oscillating wall for the receiving side of the receptacle, means for swinging the wall backwardly upon the delivery element before the latter receives its load, and releasable means for locking the wall in position when raised by the delivery element on its forward stroke.

5. In a machine of the class described, in combination, an oscillating elevating element, an oscillating delivery element receiving from the elevating element, a receptacle receiving from the delivery element, an oscillating wall for the receiving side of the receptacle, means for swinging the wall backwardly upon the delivery element before the latter receives its load, means for locking the wall in position when raised by the delivery element on its forward stroke, and means actuated by the delivery element at the beginning of its advance stroke for releasing the locking means.

6. In a machine of the class described, in combination, an oscillating elevating element, an oscillating delivery element receiving from the elevating element, a receptacle receiving from the delivery element, an oscillating wall for the receiving side of the receptacle, means for swinging the wall backwardly upon the delivery element before the latter receives its load, an arm carried by the wall, a locking detent engageable by the arm as the wall reaches its upright position, an arm carried by the delivery element for disengaging the detent, and means for swinging the wall downwardly.

7. In a machine of the class described, in combination, an oscillatable elevating fork, means for actuating the fork, a receptacle, an oscillatable transferring fork receiving from the elevating fork and delivering to the receptacle, crank arms carried by both forks, and a link connection between the cranks having lost motion connection with one thereof.

8. In a machine of the class described, in combination, an oscillating elevating fork provided with a shaft, a pair of gears loose on the shaft, a clutch for locking the gears to the shaft alternatively, means responsive to the pressure of the load received by the fork for shifting the clutch into engagement with one of the gears, means normally urging the clutch into engagement with the other of said gears, and means for driving the gears in opposite directions.

9. In a machine of the class described, in combination, an oscillating elevating fork provided with a shaft, a pair of gears loose on the shaft, a clutch for locking the gears to the shaft alternatively, means responsive to the pressure of the load received by the fork for shifting the clutch into engagement with one of the gears, means normally urging the clutch into engagement with the other of the gears, a pair of oppositely driven shafts geared one to each of the loose gears, and means for driving the shafts.

10. In a machine of the class described, in combination, an oscillatable elevating fork having a shaft, a pair of gears loosely mounted on the shaft, means for driving the gears in opposite directions, a clutch for locking the gears to the shaft alternatively, a spring normally urging the clutch into engagement with one of the gears, and a cam actuated by the pressure of the load received by the fork for shifting the clutch into engagement with the other of said gears.

11. In a machine of the class described, in combination, an oscillatable elevating fork having a shaft, a pair of gears loosely mounted on the shaft, means for driving the gears in opposite directions, a clutch for locking the gears to the shaft alternatively, a spring normally urging the clutch into engagement with one of the gears, a cam actuated by the pressure of the load received by the fork for shifting the clutch into engagement with the other of said gears, and means for shifting the clutch to neutral position as the fork approaches the limit of its down stroke.

In testimony whereof I affix my signature.

JOHN F. THOMSON.